United States Patent
Hatakeyama

(10) Patent No.: US 12,476,571 B2
(45) Date of Patent: Nov. 18, 2025

(54) POWER CONVERTER, MOTOR DRIVER, AND AIR CONDITIONER

(71) Applicant: Mitsubishi Electric Corporation, Tokyo (JP)

(72) Inventor: Kazunori Hatakeyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 166 days.

(21) Appl. No.: 18/264,984

(22) PCT Filed: Mar. 29, 2021

(86) PCT No.: PCT/JP2021/013232
§ 371 (c)(1),
(2) Date: Aug. 10, 2023

(87) PCT Pub. No.: WO2022/208593
PCT Pub. Date: Oct. 6, 2022

(65) Prior Publication Data
US 2024/0128913 A1    Apr. 18, 2024

(51) Int. Cl.
*H02P 27/08*  (2006.01)
*F24F 11/88*  (2018.01)

(52) U.S. Cl.
CPC .............. *H02P 27/08* (2013.01); *F24F 11/88* (2018.01)

(58) Field of Classification Search
CPC ........... H02P 27/08; F24F 11/88; H02M 1/32; H02M 1/007; H02M 1/4233; H02M 7/5387
See application file for complete search history.

(56) References Cited

U.S. PATENT DOCUMENTS

| 10,608,570 | B2 * | 3/2020 | Ogura | H02M 1/4225 |
| 2015/0028780 | A1 * | 1/2015 | Hatakeyama | F24F 1/38 |
| | | | | 318/400.1 |

FOREIGN PATENT DOCUMENTS

| JP | 2014150622 A | * | 8/2014 | ......... H02M 1/4225 |
| JP | 2016-171680 A | | 9/2016 | |
| JP | 2016-220378 A | | 12/2016 | |
| WO | WO-2012038787 A1 | * | 3/2012 | ........... A01D 43/006 |
| WO | WO-2016147935 A1 | * | 9/2016 | ............. H02M 7/48 |
| WO | WO-2019216138 A1 | * | 11/2019 | ............. H02M 7/12 |
| WO | WO-2021009882 A1 | * | 1/2021 | ............. H02M 7/23 |
| WO | WO-2021038787 A1 | * | 3/2021 | ........... H10D 30/635 |

OTHER PUBLICATIONS

International Search Report of the International Searching Authority mailed Jun. 22, 2021 in corresponding International Application No. PCT/JP2021/013232 (and English translation).

\* cited by examiner

*Primary Examiner* — Emmanuel E Duke
(74) *Attorney, Agent, or Firm* — POSZ LAW GROUP, PLC

(57) ABSTRACT

In a power converter, a controller controls the operation of a converter, and a control voltage generator generates a control voltage for operating the controller. When the voltage value of the direct-current voltage output from the power converter is higher than the voltage value of the control voltage and a detection signal is not output from a voltage detector that detects the power supply voltage, the operation of switching elements of the converter is stopped under the control of the controller.

11 Claims, 9 Drawing Sheets

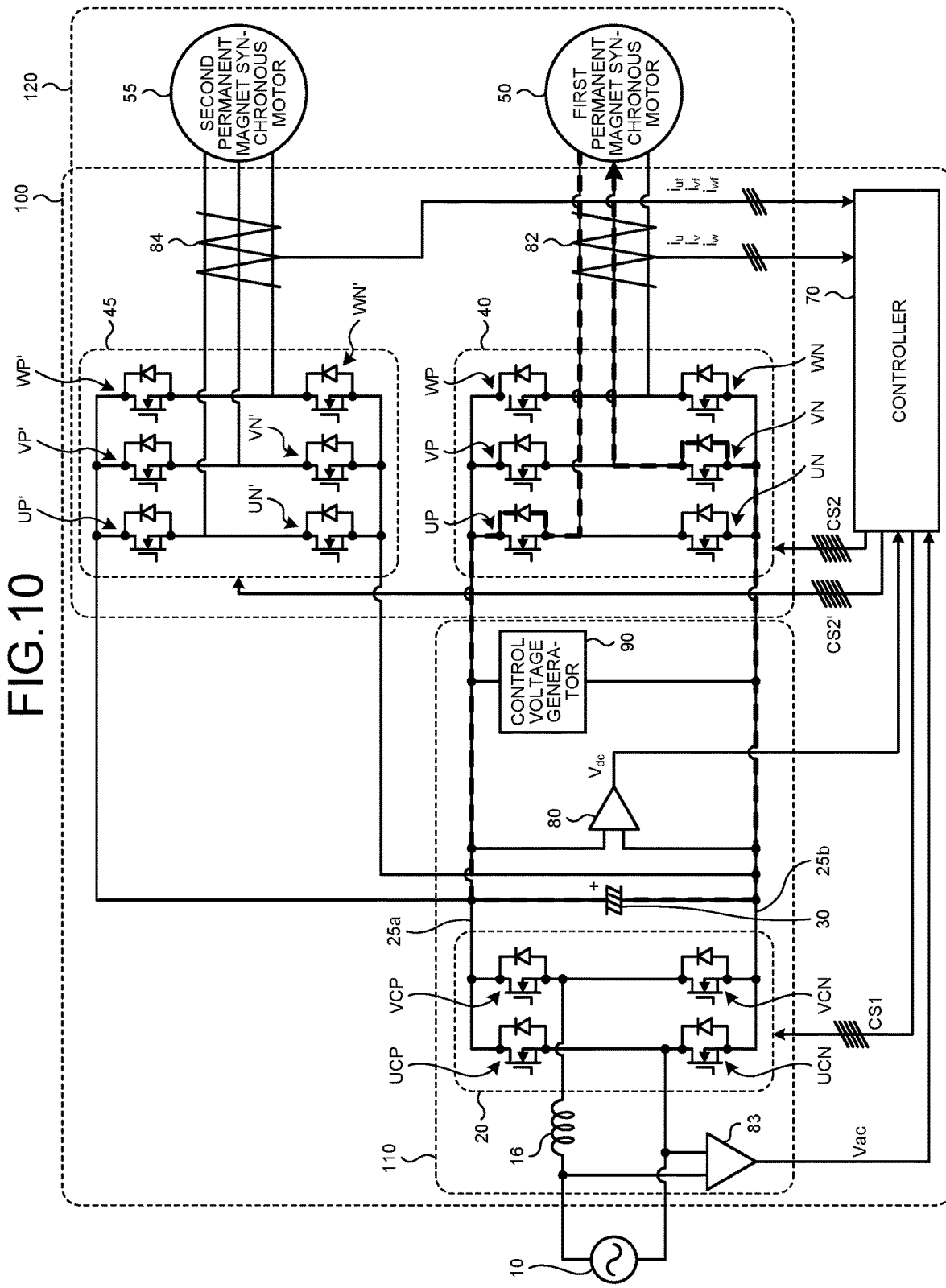

POWER CONVERTER, MOTOR DRIVER, AND AIR CONDITIONER

CROSS REFERENCE TO RELATED APPLICATION

This application is a U.S. national stage application of PCT/JP2021/013232 filed on Mar. 29, 2021, the contents of which are incorporated herein by reference.

FIELD

The present disclosure relates to a power converter that converts an alternating-current voltage applied from an alternating-current power supply into a direct-current voltage, a motor driver including the power converter, and an air conditioner including the motor driver.

BACKGROUND

The power converter described in Patent Literature 1 below includes a converter having a configuration in which metal-oxide-semiconductor field-effect transistors (MOSFETs) are connected in parallel to opposite ends of diodes connected in a full-bridge configuration. A power converter including this type of converter reduces loss by turning on a MOSFET at the timing when the diode connected in parallel to the MOSFET becomes conductive so as to cause the current to flow through the channel of the MOSFET. This technique is called "synchronous rectification".

The converter described in Patent Literature 1 is a step-up converter, and is used in an air conditioner including an outdoor fan. In a process in which the step-up converter converts an alternating-current voltage into a direct-current voltage, the voltage value of the direct-current voltage held in the smoothing capacitor is controlled to a value higher than the voltage value of the alternating-current voltage. In the step-up converter, because the power factor of the alternating current that is the current supplied from the alternating-current power supply to the converter is improved, harmonics included in the alternating current can be suppressed.

CITATION LIST

Patent Literature

Patent Literature 1: Japanese Patent Application Laid-open No. 2016-171680

SUMMARY OF INVENTION

Problem to be Solved by the Invention

As described above, in the step-up converter, the voltage of the smoothing capacitor is controlled to a value higher than the voltage value of the alternating-current voltage. Therefore, in the event of a power interruption of the alternating-current power supply, the alternating-current voltage applied to the power converter is cut off, and thus a current gradient occurs in a direction from the smoothing capacitor to the alternating-current power supply. In this case, recovery work on the alternating-current power supply may be hindered.

Recent air conditioners that achieve high efficiency are equipped with a brushless DC motor as a fan motor for driving the outdoor fan. Because the outdoor unit of an air conditioner is literally installed outdoors, strong winds from a typhoon or the like can cause the outdoor fan to rotate at high speed. The high-speed rotation of the outdoor fan generates a counter-electromotive voltage that depends on the rotation speed in the brushless DC motor connected to the outdoor fan, and this voltage is supplied to the inverter as a generated voltage with which the smoothing capacitor may be charged.

In a case the converter is a conventional diode-bridge converter, the generated voltage is blocked by the diodes, thus the generated voltage is prevented from being regenerated to the alternating-current power supply. On the other hand, in the case of a step-up converter, i.e. a converter with synchronous rectification, there is a possibility that synchronous rectification operation may cause the charge accumulated in the smoothing capacitor to flow out to the alternating-current power supply via MOSFETs, that is, flow reversely to the alternating-current power supply.

The present disclosure has been made in view of the above, and an object thereof is to obtain a power converter which includes a step-up converter with synchronous rectification, and which can reliably prevent reverse power flow to the alternating-current power supply.

Means to Solve the Problem

In order to solve the above-described problems and achieve the object, a power converter according to the present disclosure is a power converter adapted to convert an alternating-current voltage applied from an alternating-current power supply into a direct-current voltage to be applied to an inverter, the inverter driving a permanent magnet synchronous motor. The power converter includes a reactor, a converter, a capacitor, first and second detectors, a controller, and a control voltage generator. The converter includes a plurality of switching elements and connected to the alternating-current power supply via the reactor, the converter being configured by connecting the switching elements in a bridge configuration and the switching elements each including an anti-parallel connected diode. The capacitor is connected to output ends of the converter and holds the direct-current voltage. The first detector is adapted to detect a voltage value of the direct-current voltage. The second detector is adapted to detect a voltage value, a frequency, or a zero-cross point of the alternating-current voltage. The controller is adapted to control an operation of the converter. The control voltage generator is adapted to generate a control voltage for operating the controller. When the voltage value of the direct-current voltage is higher than a voltage value of the control voltage and a detection signal is not output from the second detector, an operation of the switching elements is stopped.

Effects of the Invention

The power converter according to the present disclosure includes a step-up converter with synchronous rectification, and achieves the effect of reliably preventing reverse power flow to the alternating-current power supply.

BRIEF DESCRIPTION OF DRAWINGS

FIG. 10 is a diagram for explaining the operation of the air conditioner according to the second embodiment.

DESCRIPTION OF EMBODIMENTS

Hereinafter, a power converter, a motor driver, and an air conditioner according to embodiments of the present disclosure will be described in detail based on the drawings.

First Embodiment

Figure 1:
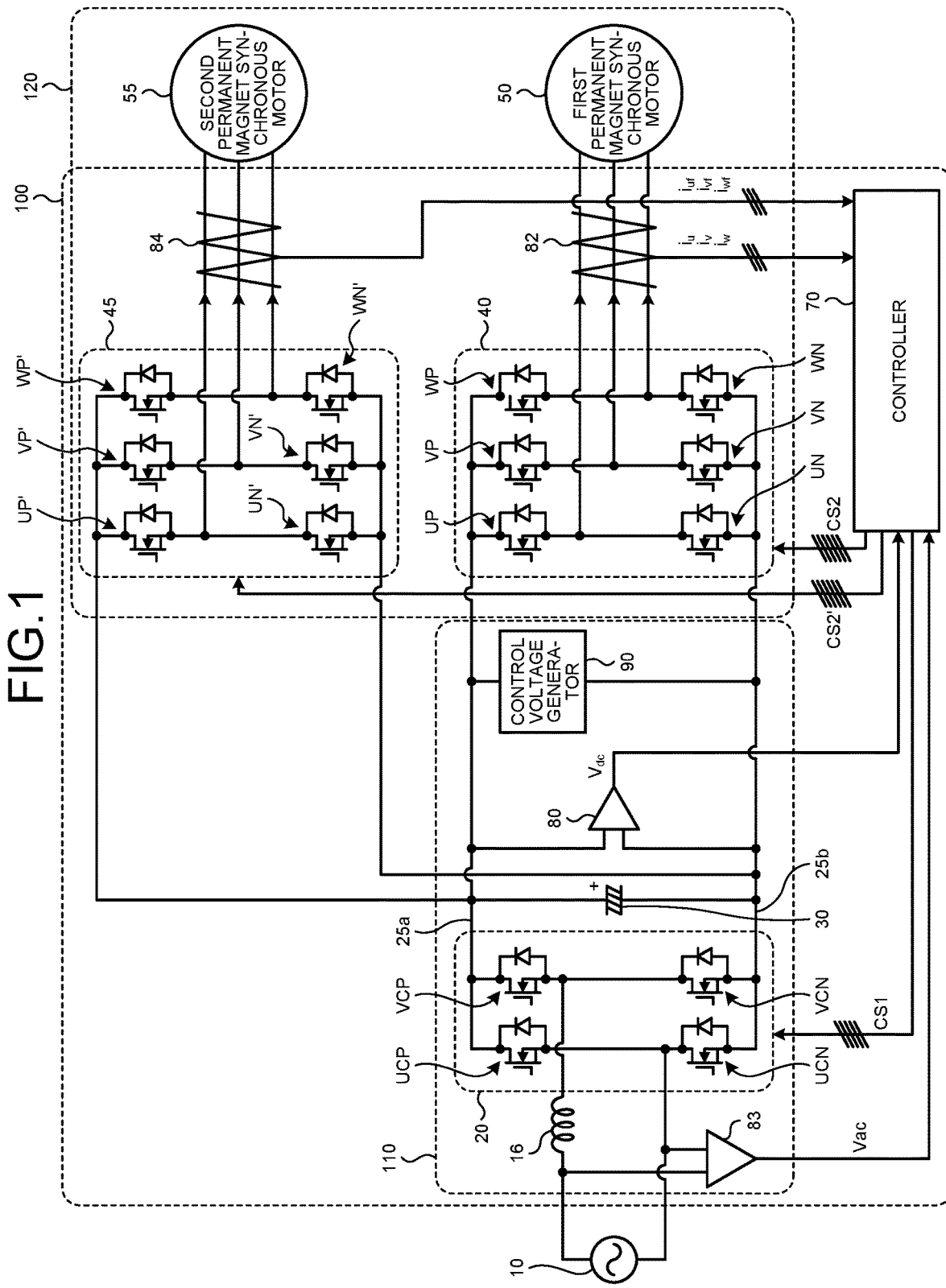
FIG. 1 is a diagram illustrating an exemplary configuration of a motor driver including a power converter according to a first embodiment.

FIG. 1 is a diagram illustrating an exemplary configuration of a motor driver 100 including a power converter 110 according to the first embodiment. As illustrated in FIG. 1, the motor driver 100 according to the first embodiment includes the power converter 110, a controller 70, and a load 120. The motor driver 100 is connected to an alternating-current power supply 10. The alternating-current power supply 10 means a power supply system that supplies alternating-current power to the motor driver 100.

As illustrated in FIG. 1, the power converter 110 includes a reactor 16, a converter 20, a capacitor 30 that is a smoothing capacitor, a voltage detector 80 that is a first detector, a voltage detector 83 that is a second detector, and a control voltage generator 90. The load 120 includes a first inverter 40, a second inverter 45, a first current detector 82, a second current detector 84, a first permanent magnet synchronous motor 50, and a second permanent magnet synchronous motor 55. Among the components of the load 120 except the first and second permanent magnet synchronous motors 50 and 55, that is, the first and second inverters 40 and 45 and the first and second current detectors 82 and 84, are components of the motor driver 100. Note that the load 120 may have a configuration including only the first permanent magnet synchronous motor 50, the first inverter 40, and the first current detector 82 and not including the second permanent magnet synchronous motor 55, the second inverter 45, and the second current detector 84.

The first inverter 40 drives the first permanent magnet synchronous motor 50, and the second inverter 45 drives the second permanent magnet synchronous motor 55. The power converter 110 is a power converter that converts an alternating-current voltage applied from the alternating-current power supply 10 into a direct-current voltage to be applied to the first and second inverters 40 and 45. The power converter 110 outputs the direct-current voltage obtained through conversion to direct-current buses 25a and 25b. The direct-current buses 25a and 25b are the electric wiring that connects the converter 20 and the load 120. Note that in this description, the alternating-current voltage output from the alternating-current power supply 10 may be referred to as the "power supply voltage".

The converter 20 includes a plurality of switching elements UCP, UCN, VCP, and VCN each including an anti-parallel connected diode, and is configured by connecting the switching elements UCP, UCN, VCP, and VCN in a full-bridge configuration. In addition, the converter 20 is connected to the alternating-current power supply 10 via the reactor 16.

FIG. 1 illustrates a case where the plurality of switching elements UCP, UCN, VCP, and VCN are MOSFETs. A MOSFET is an example of a switching element including an anti-parallel connected diode. The term "anti-parallel" means that the anode of the diode is connected to the source of the MOSFET and the cathode of the diode is connected to the drain of the MOSFET. The anti-parallel connected diode may be an externally connected diode or the parasitic diode inherent in the MOSFET. An example of an externally connected diode is a fast recovery diode. Parasitic diodes are also called body diodes. The use of parasitic diodes eliminates the need for individual diodes, so that the number of components can be reduced, leading to cost reduction.

A MOSFET is an example of a switching element that allows current to flow in both directions between the drain and the source. Any switching element may be used as long as it is a bidirectional element, which allows current to flow in both directions between the first terminal corresponding to the drain and the second terminal corresponding to the source. For example, MOSFETs having a super junction (SJ) structure (SJ-MOSFETs) or MOSFETs formed of wide bandgap (WBG) semiconductors such as gallium nitride (GaN), silicon carbide (SiC), or diamond can be used. The use of SJ-MOSFETs or MOSFETs formed of WBG semiconductors for the switching elements raises the withstanding voltage property and allowable current density, whereby the module can be reduced in size. A heat dissipation fin of a heat dissipation unit can also be reduced in size since WBG semiconductors have high heat resistance properties.

In FIG. 1, the switching elements UCP, UCN, VCP, and VCN are connected in a full-bridge configuration, but this configuration is adapted to the alternating-current power supply 10 which is a single-phase power supply. If the alternating-current power supply 10 is a three-phase power supply, the converter 20 also has a configuration corresponding to the three-phase power supply. Specifically, six switching elements are connected in a three-phase bridge configuration.

The capacitor 30 is connected to the output ends of the converter 20 via the direct-current buses 25a and 25b, and holds the direct-current voltage output from the converter 20. The voltage detector 80 detects the voltage value of the direct-current voltage. The voltage value of the direct-current voltage is generally detected by dividing the direct-current voltage using resistors connected in series and outputting the resultant voltage as a low-voltage analog signal. The voltage detector 83 detects the voltage value of the alternating-current voltage. The voltage value of the alternating-current voltage may be the instantaneous value of the alternating-current voltage, the average value of the alternating-current voltage, or the effective value of the alternating-current voltage. A detection value $V_{dc}$ of the direct-current voltage detected by the voltage detector 80 and a detection value $V_{ac}$ of the alternating-current voltage detected by the voltage detector 83 are both input to the controller 70.

In FIG. 1, the voltage detector 80 detects the bus voltage, i.e. the voltage between the direct-current bus 25a and the direct-current bus 25b, but the present disclosure is not limited thereto. The voltage detector 80 may detect the capacitor voltage, i.e. the voltage of the capacitor 30. In addition, the voltage detector 83 detects the voltage value of the alternating-current voltage, but the present disclosure is not limited thereto. The voltage detector 83 may detect the frequency of the alternating-current voltage or may detect the zero-cross point of the alternating-current voltage waveform. In addition, the voltage detector 83 may be configured to output voltage information as the detection value $V_{ac}$ to the controller 70, and the controller 70 may be configured to generate frequency information or voltage phase information.

In the load 120, the first inverter 40 includes a plurality of switching elements UP, UN, VP, VN, WP, and WN including anti-parallel connected diodes and connected in a three-phase bridge configuration. The second inverter 45 includes a plurality of switching elements UP', UN', VP', VN', WP', and WN' including anti-parallel connected diodes and connected in a three-phase bridge configuration. The first and second inverters 40 and 45 are both configured to receive the direct-current voltage output from the power converter 110 through the shared direct-current buses 25a and 25b.

The first inverter 40 drives the first permanent magnet synchronous motor 50 by supplying alternating-current power to the first permanent magnet synchronous motor 50. The second inverter 45 drives the second permanent magnet synchronous motor 55 by supplying alternating-current power to the second permanent magnet synchronous motor 55.

In the first and second inverters 40 and 45, the plurality of switching elements UP, UN, VP, VN, WP, WN, UP', UN', VP', VN', WP', and WN' are described as MOSFETs, but switching elements other than MOSFETs may be used.

The first current detector 82 detects a first motor current flowing between the first inverter 40 and the first permanent magnet synchronous motor 50. The second current detector 84 detects a second motor current flowing between the second inverter 45 and the second permanent magnet synchronous motor 55. The first and second current detectors 82 and 84 are exemplified by current transformers. Note that any detection means may be used as long as it can detect the first and second motor currents or a physical quantity correlated with these currents. In addition, the configuration for detecting the first and second motor currents may be replaced with a configuration for detecting first and second inverter currents, i.e. currents on the input side of the first and second inverters 40 and 45. Detection values $i_u$, $i_v$, and $i_w$ of the first motor current detected by the first current detector 82 and detection values $i_{uf}$, $i_{vf}$ and $i_{wf}$ of the second motor current detected by the second current detector 84 are both input to the controller 70.

The control voltage generator 90 is a control power supply that generates a control voltage for operating the controller 70. Generally, the control voltage is a low direct-current voltage of 24 [V] or less. As the power supply system, a switched-mode power supply system with a switching element and a transformer is generally adopted. Since the switched-mode power supply system includes a transformer, a non-isolated voltage and an isolated voltage can be generated for the capacitor 30.

The controller 70 generates a control signal CS1 for controlling the operation of the converter 20 based on information of the control voltage generated by the control voltage generator 90, the detection value $V_{dc}$ obtained from the voltage detector 80, and the detection value $V_{ac}$ obtained from the voltage detector 83, and outputs the control signal CS1 to the converter 20. The control signal CS1 is a pulse train signal that controls the conduction of the switching elements UCP, UCN, VCP, and VCN of the converter 20. The voltage value of the capacitor voltage is controlled with the control signal CS1, and the alternating current is controlled to approach a sine wave. As a result, the power factor of the alternating current is improved, and harmonics included in the alternating current can be suppressed. In addition, the synchronous rectification described in the Background section is performed with the control signal CS1. Synchronous rectification that is performed in the power converter 110 according to the first embodiment will be described later.

In addition, the controller 70 generates a control signal CS2 for controlling the switching elements UP, UN, VP, VN, WP, and WN provided in the first inverter such that the first permanent magnet synchronous motor 50 rotates at a desired rotation speed based on the detection value $V_{dc}$ obtained from the voltage detector 80 and the detection values $i_u$, $i_v$, and $i_w$ obtained from the first current detector 82. The control signal CS2 is a pulse train signal for performing pulse width modulation (PWM) control on the switching elements UP, UN, VP, VN, WP, and WN of the first inverter 40.

Similarly, the controller 70 generates a control signal CS2' for controlling the switching elements UP', UN', VP', VN', WP', and WN' provided in the second inverter such that the second permanent magnet synchronous motor 55 rotates at a desired rotation speed based on the detection value $V_{dc}$ obtained from the voltage detector 80 and the detection values $i_{uf}$, $i_{vf}$ and $i_{wf}$ obtained from the second current detector 84. The control signal CS2' is a pulse train signal for performing PWM control on the switching elements UP', UN', VP', VN', WP', and WN' of the second inverter 45.

Next, the basic operation of the power converter 110 according to the first embodiment will be described. First, the switching elements UCP and UCN operate complementarily so as not to be simultaneously on. That is, when either the switching element UCP or UCN is on, the other is off. Similarly, the switching elements VCP and VCN operate complementarily so as not to be simultaneously on. That is, when either the switching element VCP or VCN is on, the other is off. The controller 70 controls the switching elements UCP, UCN, VCP, and VCN to on or off so that the alternating current flowing to the alternating-current power supply 10 through the reactor 16 and the capacitor 30 does not become excessive.

Next, the relationship between the state of the switching elements UCP, UCN, VCP, and VCN in the first embodiment and current paths through the power converter 110 according to the first embodiment will be described. Before the description, the structure of a MOSFET will be described with reference to FIG. 2.

Figure 2:
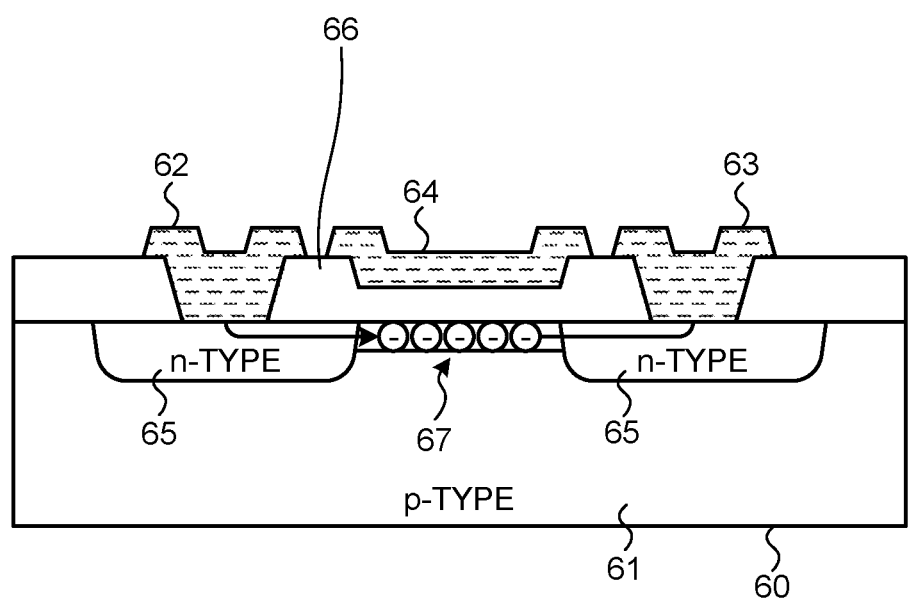
FIG. 2 is a schematic cross-sectional diagram illustrating a simplified structure of a MOSFET used in a converter according to the first embodiment.

FIG. 2 is a schematic cross-sectional diagram illustrating a simplified structure of a MOSFET used in the converter 20 according to the first embodiment. In FIG. 2, an n-type MOSFET is illustrated.

In the case of the n-type MOSFET, a p-type semiconductor substrate 60 having a p-type region 61 is used as illustrated in FIG. 2. A source electrode 62, a drain electrode 63, and a gate electrode 64 are formed on the semiconductor substrate 60. High-concentration impurities are ion-implanted into the contacts with the source electrode 62 and the drain electrode 63 to form n-type regions 65. On the p-type semiconductor substrate 60, an oxide insulating film 66 is formed between a portion without the n-type regions 65 and the gate electrode 64. That is, the oxide insulating film 66 is interposed between the gate electrode 64 and the p-type region 61 of the semiconductor substrate 60.

When a positive voltage is applied to the gate electrode 64, electrons are attracted to the interface between the p-type region 61 of the semiconductor substrate 60 and the oxide insulating film 66, and the interface is negatively charged. In the place where electrons gather, the density of electrons is greater than the hole density. Therefore, this place becomes n-type. This n-type portion serves as a current path, which is called a channel. FIG. 2 is an example in which an n-type channel 67 is formed. In the case of a p-type MOSFET, a p-type channel is formed.

When synchronous rectification is performed, since a MOSFET is controlled to be on, the flow of current through the n-type channel 67 is larger than the flow of current through the anti-parallel diode or parasitic diode. Note that in the case of the n-type MOSFET configured as in FIG. 2, the parasitic diode is formed in the p-type region 61.

Figure 3:
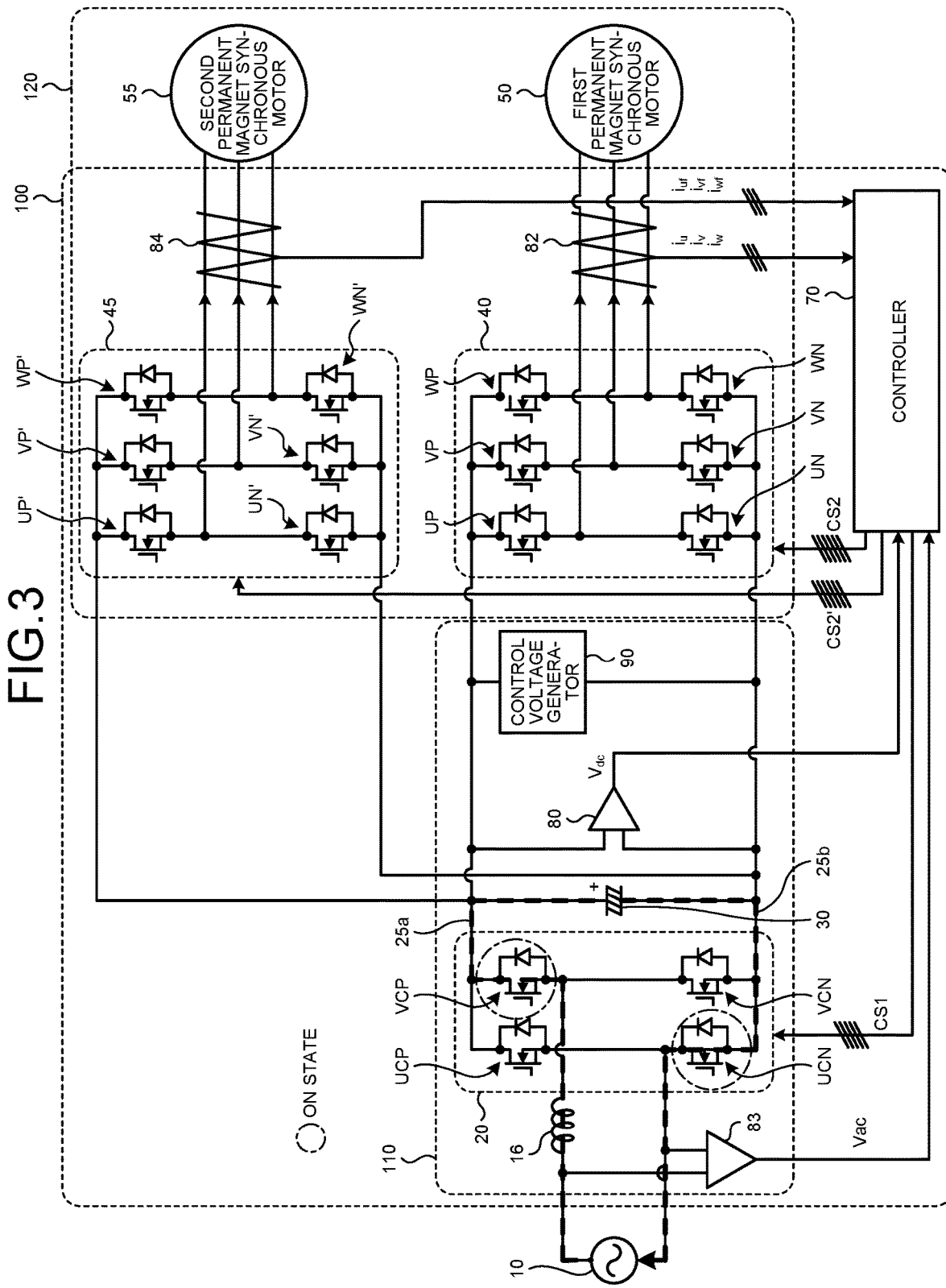
FIG. 3 is a diagram illustrating a first example of a current path through the power converter according to the first embodiment.

FIG. 3 is a diagram illustrating a first example of a current path through the power converter 110 according to the first embodiment. FIG. 3 depicts an example in which the power supply voltage polarity, i.e. the polarity of the power supply voltage, is positive. When the power supply voltage polarity is positive, the switching elements UCN and VCP are on, and the switching elements UCP and VCN are off. In this state, the current flows through the path of the alternating-current power supply 10, the reactor 16, the switching element VCP, the capacitor 30, the switching element UCN, and the alternating-current power supply 10. When each switching element is a MOSFET, in the first embodiment, the current does not flow through the parasitic diode of each MOSFET but flows through the channel of each MOSFET, whereby synchronous rectification operation is performed. Note that in FIG. 3, the switching elements that are on are indicated by circles. The same applies to the following drawings.

Although not illustrated, when the power supply voltage polarity is negative, the switching elements UCP and VCN are on, and the switching elements UCN and VCP are off. In this state, the current flows through the path of the alternating-current power supply 10, the switching element UCP, the capacitor 30, the switching element VCN, the reactor 16, and the alternating-current power supply 10. As in the case where the power supply voltage polarity is positive, the current does not flow through the parasitic diodes of the switching elements UCP and VCN but flows through the respective channels, whereby synchronous rectification operation is performed.

Figure 4:
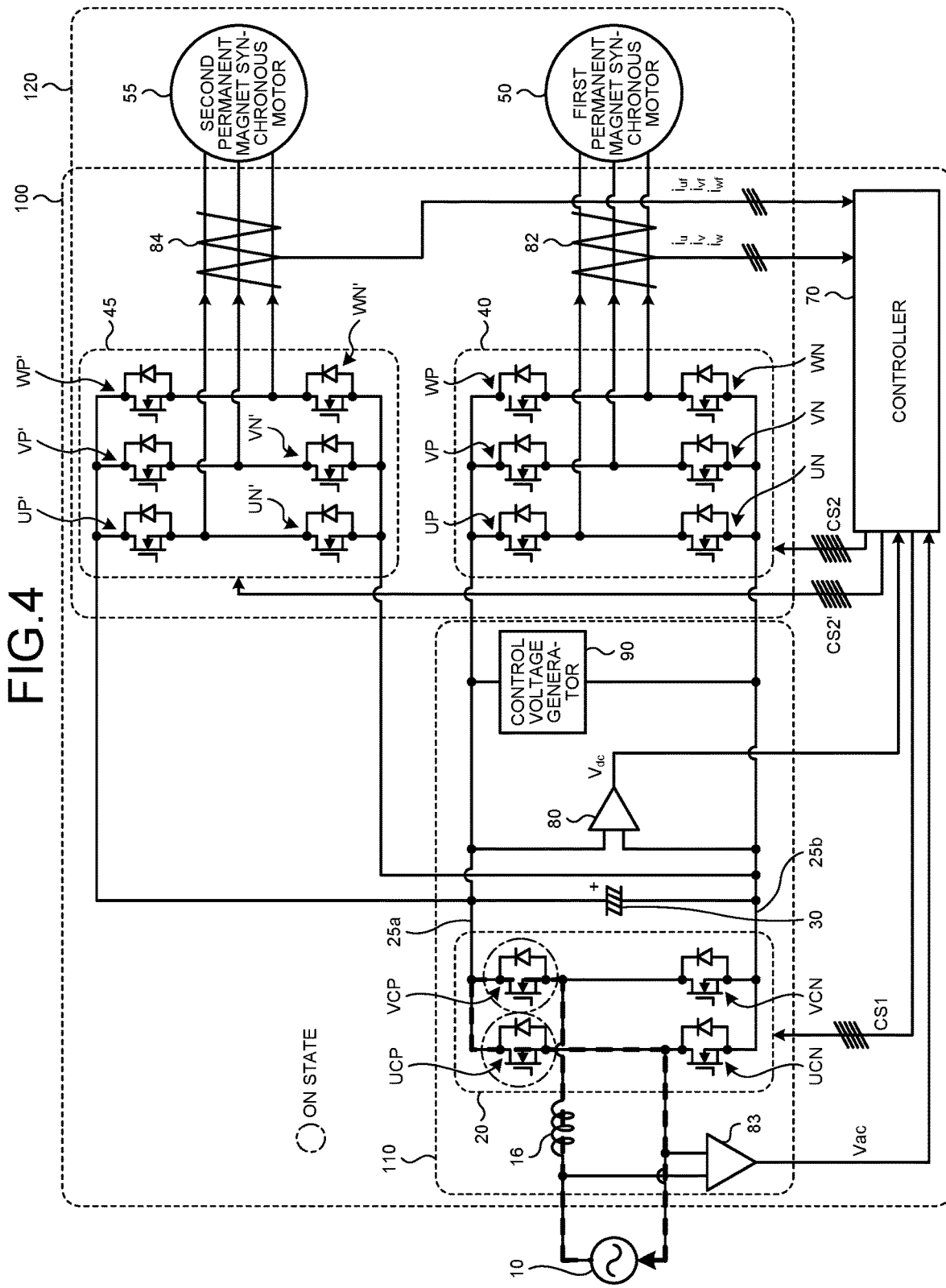
FIG. 4 is a diagram illustrating a second example of a current path through the power converter according to the first embodiment.

FIG. 4 is a diagram illustrating a second example of a current path through the power converter 110 according to the first embodiment. FIG. 4 depicts an example in which the power supply voltage polarity is positive, with the switching elements UCP and VCP on and the switching elements UCN and VCN off. In this state, the current flows through the path of the alternating-current power supply 10, the reactor 16, the switching element VCP, the switching element UCP, and the alternating-current power supply 10, and a power supply short-circuit path that does not include the capacitor 30 is formed. In this manner, in the first embodiment, the current does not flow through the parasitic diodes of the switching elements UCP and VCP but flows through the respective channels, whereby the power supply short-circuit path is formed.

Although not illustrated, when the power supply voltage polarity is negative, the switching elements UCN and VCN are on, and the switching elements UCP and VCP are off. In this state, the current flows through the alternating-current power supply 10, the switching element UCN, the switching element VCN, the reactor 16, and the alternating-current power supply 10 in this order, and a power supply short-circuit path that does not include the capacitor 30 is formed. In this manner, in the first embodiment, the current does not flow through the parasitic diodes of the switching elements UCN and VCN but flows through the respective channels, whereby the power supply short-circuit path is formed.

The controller 70 controls the switching between the current paths described above to control the power supply current waveform, thereby reducing the harmonic current and improving the power factor. During the power supply short-circuit operation, the energy stored in the reactor 16 is released to the capacitor 30, whereby the voltage of the capacitor 30 can be raised.

Here, various operations for different purposes can be performed by combining the operations of the switching elements UCP, UCN, VCP, and VCN. For example, the synchronous rectification operation of at least one of the switching elements UCP, UCN, VCP, and VCN may be stopped, that is, the current may be caused to flow not through the channel of the MOSFET but through the parasitic diode. Alternatively, one MOSFET of the switching elements UCP, UCN, VCP, and VCN may be replaced with a diode, and similar operations may be implemented.

Figure 5:
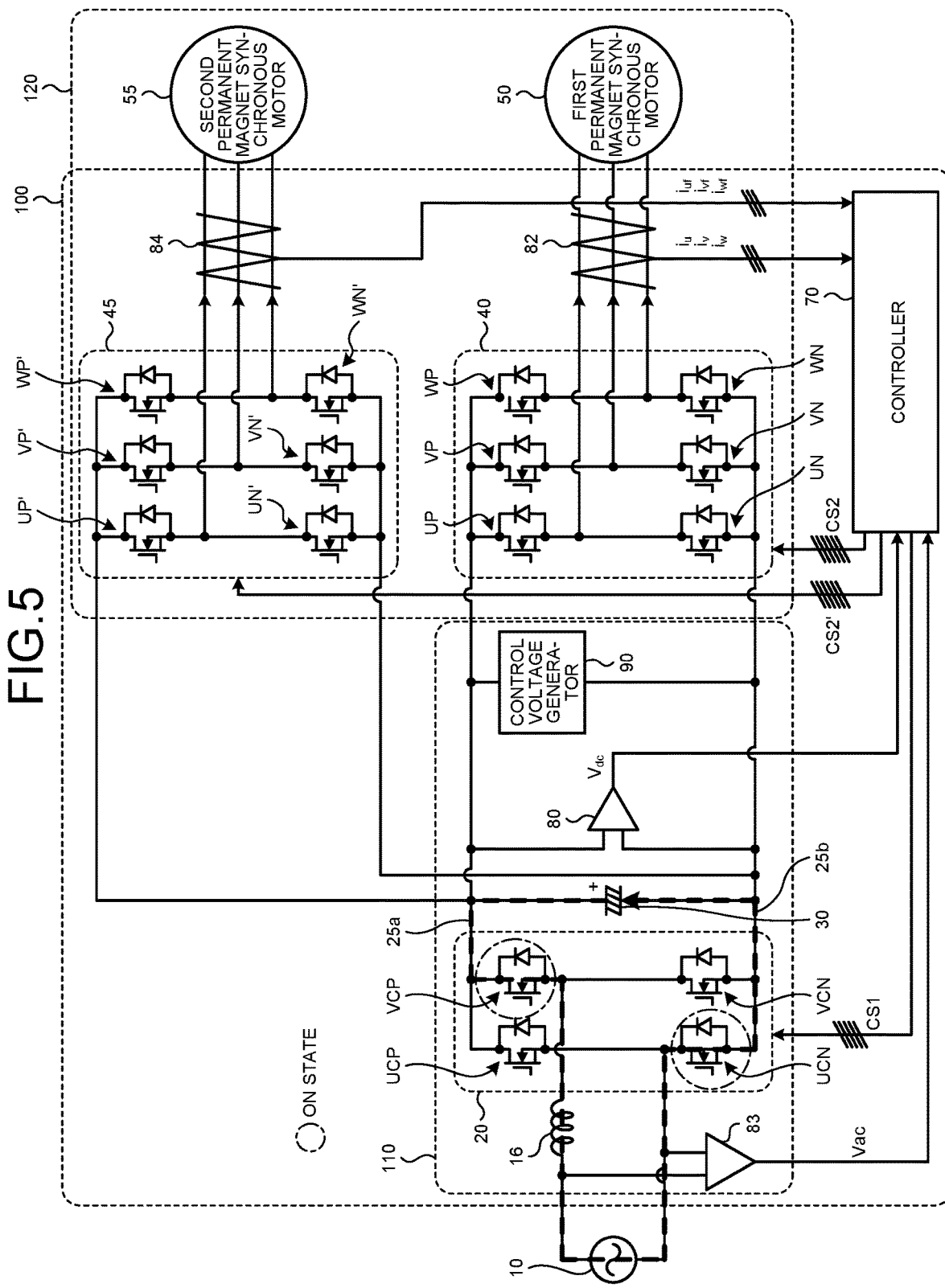
FIG. 5 is a diagram illustrating an example of a path through which a regenerative current can flow in the power converter according to the first embodiment.

Next, an operation in which the energy of the capacitor 30 is regenerated to the alternating-current power supply 10 will be described with reference to FIG. 5. FIG. 5 is a diagram illustrating an example of a path through which a regenerative current can flow in the power converter 110 according to the first embodiment. Note that FIG. 5 depicts an example in which the power supply voltage polarity is positive.

When the power supply voltage polarity is positive, the switching elements UCN and VCP are on as illustrated in FIG. 5. The operation in this case is supposed to be the synchronous rectification described above. However, if the voltage of the capacitor 30 is higher than the voltage of the alternating-current power supply 10, charging from the alternating-current power supply 10 to the capacitor 30 is not performed. In addition, because the switching elements UCN and VCP which are MOSFETs function as bidirectional switches, a regenerative current flows from the capacitor 30 having a relatively high potential to the alternating-current power supply 10 having a relatively low potential. This regenerative current is similarly generated when the power supply voltage polarity is negative. Therefore, it is necessary to appropriately control the switching elements UCP, UCN, VCP, and VCN according to the polarity of the power supply voltage or the power supply current.

As described above, if the voltage of the capacitor 30 is higher than the voltage of the alternating-current power supply 10, a regenerative current from the capacitor 30 to the alternating-current power supply 10 can flow. For this reason, in the event that a power interruption occurs in the alternating-current power supply while the capacitor 30 is holding a voltage, a regenerative current may flow depending on how the switching elements UCP, UCN, VCP, and VCN operate.

In general, electric power devices that have an inverter often use the capacitor 30 with a large capacity of several 1000 [μF], therefore relatively excessive voltages may be applied to the alternating-current power supply 10. As long as the alternating-current power supply 10 is normally supplied, such excessive voltages cannot be accidentally touched. However, in a state where the alternating-current power supply 10 is lost due to, for example, power interruption or the like, there is a possibility that a recovery worker may touch the excessive voltage. Therefore, it is necessary to appropriately deal with this type of regenerative operation to secure the safety of workers.

Figure 6:
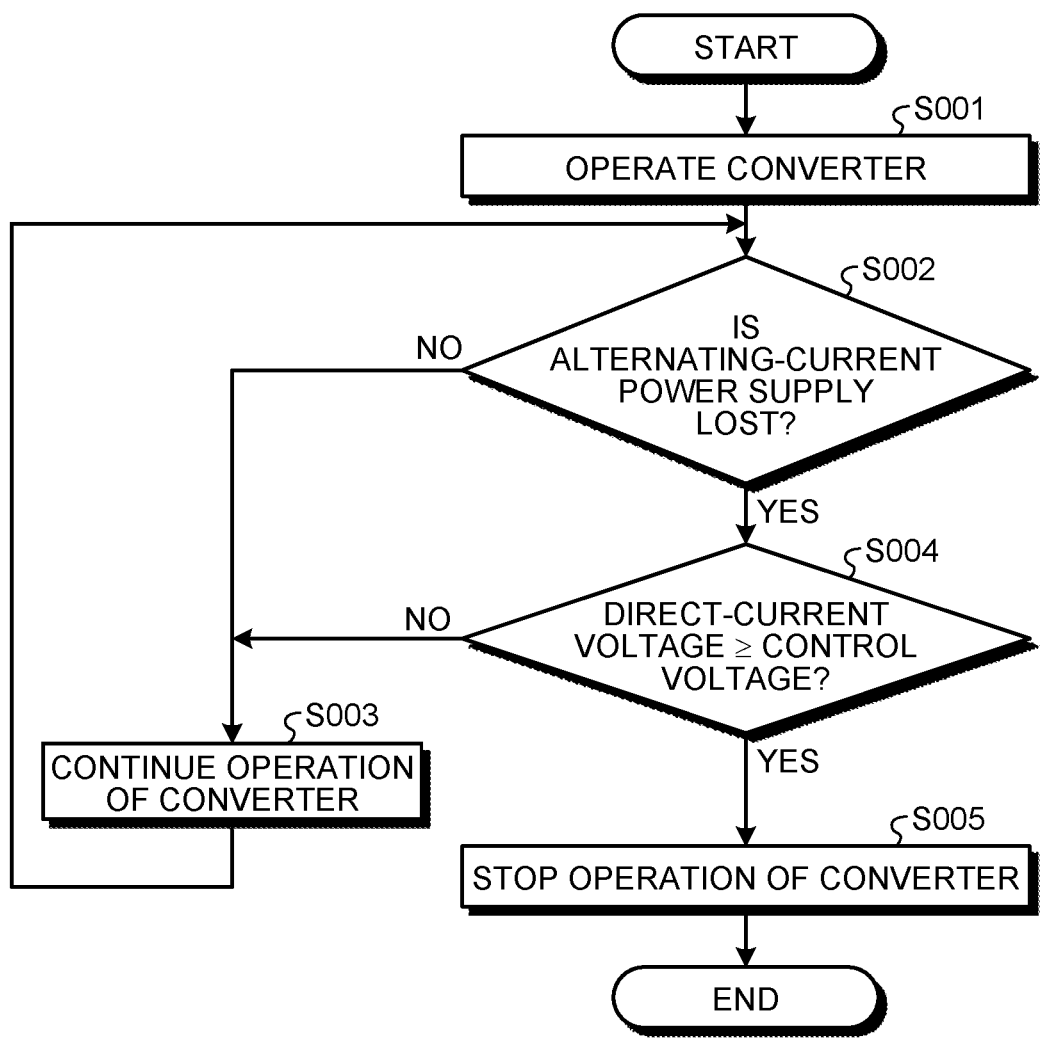
FIG. 6 is a flowchart for explaining the operation of the main part of the power converter according to the first embodiment.

In order to stop the regenerative operation, the switching elements UCP, UCN, VCP, and VCN are stopped so that the regenerative operation is blocked by the parasitic diodes. Meanwhile, in order to operate the controller 70, the control voltage for operating the controller 70 needs to be secured. Therefore, the power converter 110 according to the first embodiment is operated according to the control flow illustrated in FIG. 6. FIG. 6 is a flowchart for explaining the operation of the main part of the power converter 110 according to the first embodiment.

First, step S001 indicates that the converter 20 is operating. In step S002, it is determined whether the alternating-current power supply 10 is lost. If the alternating-current power supply 10 is not lost (step S002: No), the process proceeds to step S003 to continue the operation of the converter 20. Thereafter, the process returns to step S002 to continue the control flow of FIG. 6. On the other hand, if the alternating-current power supply 10 is lost (step S002: Yes), the process proceeds to step S004. In step S004, the magnitude relationship between the direct-current voltage and the control voltage is compared. If the direct-current voltage is less than the control voltage (step S004: No), it is determined that there is no possibility of reverse power flow of excessive voltage to the alternating-current power supply 10, and the process proceeds to step S003 to continue the operation of the converter 20. Thereafter, the process returns to step S002 to continue the control flow of FIG. 6. On the other hand, if the direct-current voltage is equal to or higher than the control voltage (step S004: Yes), the process proceeds to step S005 to stop the operation of the converter 20 and to end the control flow of FIG. 6.

Note that in step S004 of FIG. 6, the case where the direct-current voltage is equal to the control voltage is classified as "Yes", but this case may be classified as "No". That is, the case where the direct-current voltage is equal to the control voltage may be classified as either "Yes" or "No".

In addition, the determination as to whether the alternating-current power supply 10 is lost in step S002 of FIG. 6 can be made based on a detection signal coming from the voltage detector 83, which is the second detector. Specifically, the determination that the alternating-current power supply 10 is lost can be made in the absence of any detection signal output from the voltage detector 83. The absence of any detection signal output means that no significant signal is output from the voltage detector 83.

Below is a supplement to the configuration or operation of the power converter 110 related to the control flow of FIG. 6. To begin with, the ability of the control voltage generator 90 to generate a control voltage decreases at capacitor voltages less than 50 [V] to an extent that hinders the converter 20 from stably operating, although it depends on the capacitance of the capacitor 30. A possible countermeasure is to use MOSFETs of normally-off type for the switching elements UCP, UCN, VCP, and VCN constituting the converter 20. In general, drive signals for driving MOSFETs are usually designed to turn off the MOSFETs at low signal levels. Therefore, the switching elements UCP, UCN, VCP, and VCN which are MOSFETs of normally-off type enable fail-safe control of the converter 20.

Generally, the human body is assumed to be unaffected by voltages of up to about 42 [V]. This voltage of 42 [V] is only slightly different from the minimum operating voltage of the control voltage generator 90, namely 50 [V], with a difference of 8 [V]. The charge amount Q accumulated in the capacitor 30, the electrostatic capacitance C of the capacitor 30, and the capacitor voltage V have a relationship of $Q=C \times V$. Therefore, given the capacitance C=2000 [μF], for example, the charge amount Q corresponding to the voltage difference of 8 [V] is 16 [mC]. Here, the safety value of the current passing through the human body is assumed to be 50 [mA/s], and supposing that 16 [mC] flows for one second, the current change rate is 16 [mA/s]. After the lapse of one second, the charge of 16 [mC] is released from the capacitor 30, and the capacitor voltage becomes 50−8=42 [V] or less. Therefore, it is not too much to say that the operating voltage of 50 [V] does not affect the human body.

In cases where the power converter 110 is applied to an air conditioner, the capacitor voltage at the step-up operation of the converter 20 is mostly about 300 [V]. In this case, the above-described voltage difference is 300 [V]−42 [V]=258 [V], and the charge amount accumulated in the capacitor 30 with a capacitance of 2000 [μF] is 516 [mC], which is about 32 times larger than 16 [mC]. This charge amount is not sufficient to draw the conclusion that it affects the human body. However, it is a likely future trend that energy-saving air conditioners with synchronous rectification will be provided as a standard feature. Even though one or a few air conditioners may be safe to operate, it is anticipated that assembling a large number of air conditioners with synchronous rectification can cause trouble in the future. Thus, it can be said that operating the power converter 110 according to the control flow of FIG. 6 has great significance as a technology that would underpin future product development.

As described above, in the power converter 110 according to the first embodiment, the controller 70 controls the operation of the converter 20, and the control voltage generator 90 generates a control voltage for operating the controller 70. Then, when the voltage value of the direct-current voltage output from the power converter 110 is higher than the voltage value of the control voltage and a detection signal is not output from the voltage detector 83 that detects the power supply voltage, the operation of the switching elements UCP, UCN, VCP, and VCN of the converter 20 is stopped under the control of the controller 70. This control enables the power converter 110, which includes the step-up converter and performs synchronous rectification, to reliably prevent reverse power flow to the alternating-current power supply 10. This makes it possible to implement the power converter 110 with high reliability.

Note that in the case of constructing the control voltage generator 90 using a switched-mode power supply system, it is preferable to set the operating voltage to 42 [V], which is the safety voltage for the human body. Alternatively, the operating voltage may be set to 50 [V] or higher according to the specifications of the switched-mode power supply system or in order to prevent a decrease in the ability of the control voltage generator 90 to generate a control voltage. It is however needless to say that the setting of the operating voltage to 50 [V] or higher should be determined by consideration of the capacitance of the capacitor 30.

Figure 7:
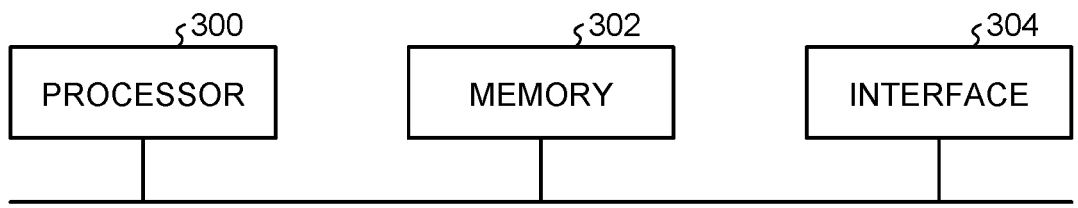
FIG. 7 is a block diagram illustrating an example of a hardware configuration for implementing the functions of the controller according to the first embodiment.
Figure 8:
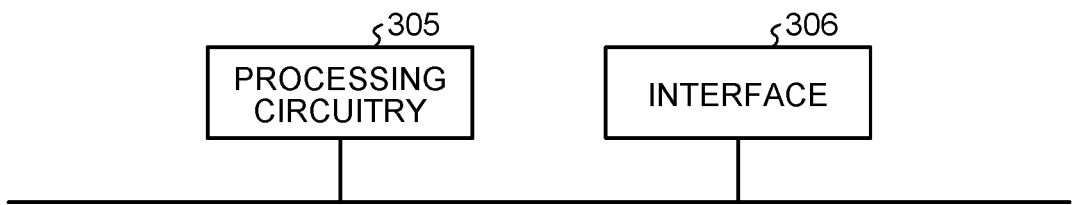
FIG. 8 is a block diagram illustrating another example of a hardware configuration for implementing the functions of the controller according to the first embodiment.

Next, hardware configurations for implementing the functions of the controller 70 according to the first embodiment will be described with reference to the drawings of FIGS. 7 and 8. FIG. 7 is a block diagram illustrating an example of a hardware configuration for implementing the functions of the controller 70 according to the first embodiment. FIG. 8 is a block diagram illustrating another example of a hardware configuration for implementing the functions of the controller 70 according to the first embodiment.

The functions of the controller 70 according to the first embodiment can be implemented with a configuration illustrated in FIG. 7 including: a processor 300 that performs calculation; a memory 302 in which programs that are read by the processor 300 are saved; and an interface 304 that performs input and output of signals.

The processor 300 is a calculation means called a calculation device, a microprocessor, a microcomputer, a central processing unit (CPU), a digital signal processor (DSP), or a system large scale integration (LSI). The memory 302 can be exemplified by a non-volatile or volatile semiconductor memory, a magnetic disk, a flexible disk, an optical disc, a compact disc, a mini disc, a digital versatile disc (DVD), or the like. Examples of non-volatile or volatile semiconductor memories include a random access memory (RAM), a read only memory (ROM), a flash memory, an erasable programmable ROM (EPROM), an electrically EPROM (EEPROM, registered trademark), and the like.

The memory 302 stores a program for executing the functions of the controller 70 according to the first embodiment. The processor 300 exchanges necessary information via the interface 304, and the above-described processes can be performed by the processor 300 executing the program stored in the memory 302. The calculation result by the processor 300 can be stored in the memory 302.

For implementing the functions of the controller 70 according to the first embodiment, a processing circuitry 305 illustrated in FIG. 8 can also be used. For example, the processing circuitry 305 is a single circuit, a composite circuit, an application specific integrated circuit (ASIC), a field-programmable gate array (FPGA), or a combination thereof. Information input to the processing circuitry 305 and information output from the processing circuitry 305 can be obtained via the interface 306. Note that even in the configuration using the processing circuitry 305, some of the processes in the controller 70 may be performed by the processor 300 having the configuration illustrated in FIG. 7.

Second Embodiment

The second embodiment describes an air conditioner including the power converter 110 described in the first embodiment.

Figure 9:
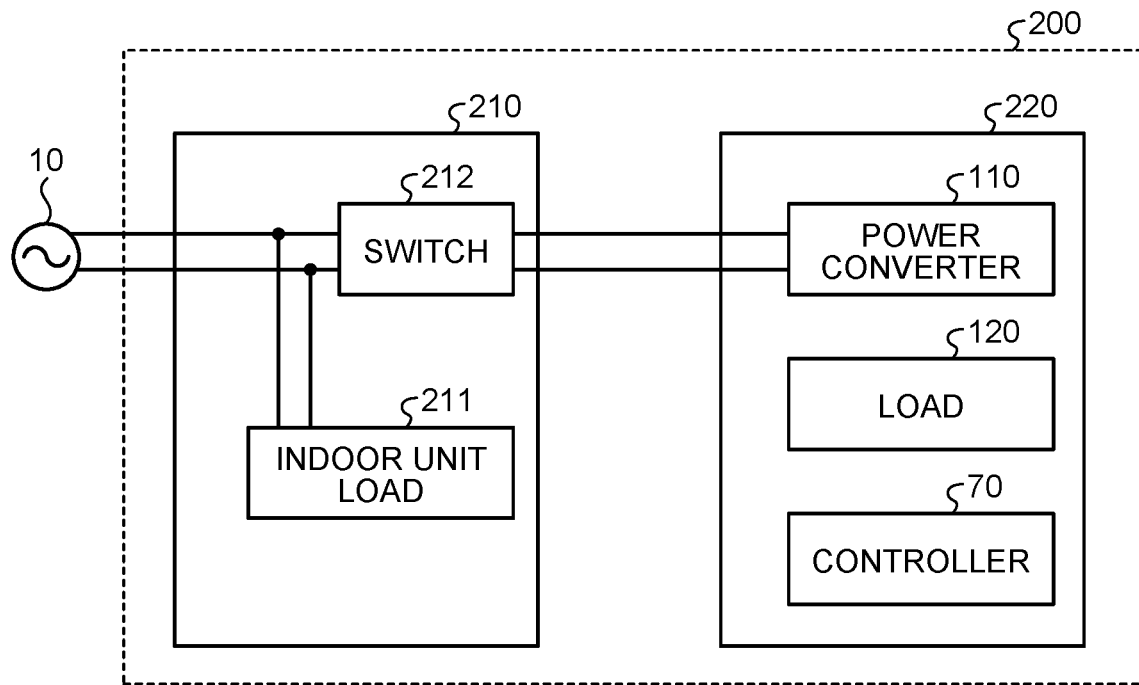
FIG. 9 is a diagram illustrating an exemplary configuration of an air conditioner according to a second embodiment.

FIG. 9 is a diagram illustrating an exemplary configuration of an air conditioner 200 according to the second embodiment. The air conditioner 200 illustrated in FIG. 9 is a separate-type air conditioner, and includes an indoor unit 210 and an outdoor unit 220. The indoor unit 210 includes an indoor unit load 211 and a switch 212. The outdoor unit 220 includes the power converter 110, the load 120, and the controller 70 described in the first embodiment.

Although not illustrated, the indoor unit load 211 includes a fan motor that drives the blower fan of the indoor unit 210, a stepping motor that moves a flap or the like for wind direction adjustment, and a controller for operating them. In addition, in a model in which the indoor unit 210 receives the alternating-current power supply 10, operation is performed such that when an activation command to the air conditioner 200 is input by a remote controller or an emergency operation switch, the switch 212 is closed to apply the alternating-current voltage from the alternating-current power supply 10 to the outdoor unit 220.

In the event that the alternating-current power supply 10 is lost due to power interruption or the like, there is a risk that energy resulting from the regenerative operation of the power converter 110 may be supplied to the alternating-current power supply 10 until the switch 212 is opened. Even if the switch 212 is open, regenerative energy is still supplied to the switch 212 of the indoor unit 210. Therefore, a user or a service engineer in charge of repair or the like may accidentally touch the switch 212 of the indoor unit 210.

Next, the operation of the power converter 110 unique to the air conditioner will be described with reference to FIG. 10. FIG. 10 is a diagram for explaining the operation of the air conditioner 200 according to the second embodiment. In FIG. 10, the first inverter 40 and the first permanent magnet synchronous motor 50 are used to drive the outdoor fan (not illustrated) in the outdoor unit 220. Note that the outdoor fan is a fan device for performing heat exchange in the outdoor unit 220. In addition, in FIG. 10, the first inverter 40 and the first permanent magnet synchronous motor 50 are used to drive the compressor (not illustrated) in the outdoor unit 220. Note that the compressor performs the operation of compressing the refrigerant and circulating the refrigerant in and out of the room.

The outdoor unit 220 is generally installed outdoors, and thus is exposed to wind and rain. When rotated by an external force, the first permanent magnet synchronous motor 50 operates as a generator to generate a voltage. FIG. 10 depicts a path through which a current flows between the U phase and the V phase when the first permanent magnet synchronous motor 50 operates as a generator. The current flowing out from the U phase of the first permanent magnet synchronous motor 50 flows through the path of the diode of the switching element UP, the capacitor 30, and the diode of the switching element VN, and flows into the V phase. The capacitor 30 is charged by this current. Note that in different time slots, similar currents flow between the V phase and the W phase and between the W phase and the U phase.

The generated voltage of the first permanent magnet synchronous motor 50 is proportional to the rotation speed. A typical rotation speed for driving the outdoor fan is about 1000 [rpm]. However, when the outdoor unit 220 is exposed to strong winds from a typhoon or the like, the rotation speed may reach nearly five times the typical rotation speed. In this case, the current flowing through the path in FIG. 10 causes a generated voltage in the capacitor 30 which is significantly higher than the voltage of the alternating-current power supply 10, resulting in the capacitor 30 storing a certain level of voltage or higher.

With the capacitor 30 storing a certain level of voltage or higher, the control voltage generator 90 generates a control voltage with which the controller 70 can be activated. The controller 70 activated may then control the switching elements UCP, UCN, VCP, and VCN of the converter 20, which can result in an excessive voltage to the alternating-current power supply 10. In particular, during a power interruption, the potential difference between the alternating-current power supply 10 and the capacitor 30 is so large that an excessive regenerative current may flow. In addition, because the converter 20 is designed to receive an input voltage of 100 [V] or 200 [V], there is a possibility that a short circuit may occur due to the insufficient insulation distance and cause damage to the circuit, and that the varistor may operate as a protection device against the application of excessive voltage.

The above-described phenomena can also occur during a power interruption in which power is not supplied to the outdoor unit 220, and can occur even when the switch 212 is open if the outdoor fan rotates. Therefore, it is necessary to appropriately protect the air conditioner 200 from these phenomena. Thus, in the air conditioner 200 according to the second embodiment, once the controller 70 is activated by rotation of the outdoor fan, the detection value $V_{ac}$ from the voltage detector 83 is checked first. If the power supply voltage is not detected but the controller 70 is active, it is determined that the outdoor fan is rotating due to strong winds from a typhoon or the like, and the operation of the switching elements UCP, UCN, VCP, and VCN is stopped. This control enables the power converter 110 provided in the air conditioner 200, which includes the step-up converter 20 and performs synchronous rectification, to reliably prevent reverse power flow to the alternating-current power supply 10. This makes it possible to implement the air conditioner 200 with high reliability.

The configurations described in the above-mentioned embodiments indicate examples of the contents of the present invention. The configurations can be combined with another well-known technique, and some of the configurations can be omitted or changed in a range not departing from the gist of the present invention.

REFERENCE SIGNS LIST 10 alternating-current power supply; 16 reactor; 20 converter; 25a, 25b direct-current bus; 30 capacitor; 40 first inverter; 45 second inverter; 50 first permanent magnet synchronous motor; 55 second permanent magnet synchronous motor; 60 semiconductor substrate; 61 p-type region; 62 source electrode; 63 drain electrode; 64 gate electrode; 65 n-type region; 66 oxide insulating film; 67 n-type channel; 70 controller; 80, 83 voltage detector; 82 first current detector; 84 second current detector; 90 control voltage generator; 100 motor driver; 110 power converter; 120 load; 200 air conditioner; 210 indoor unit; 211 indoor unit load; 212 switch; 220 outdoor unit; 300 processor; 302 memory; 304, 306 interface; 305 processing circuitry; UCP, UCN, VCP, VCN, UP, UN, VP, VN, WP, WN, UP', UN', VP', VN', WP', WN' switching element.

The invention claimed is:

1. A power converter adapted to convert an alternating-current voltage applied from an alternating-current power supply into a direct-current voltage to be applied to an inverter, the inverter driving a permanent magnet synchronous motor, the power converter comprising:
   a reactor;
   a converter comprising a plurality of switching elements and connected to the alternating- current power supply via the reactor, the converter being configured by connecting the switching elements in a bridge configuration and the switching elements each comprising an anti-parallel connected diode;
   a capacitor connected to output ends of the converter and holding the direct-current voltage;
   a first detector adapted to detect a voltage value of the direct-current voltage;
   a second detector adapted to detect a voltage value, a frequency, or a zero-cross point of the alternating-current voltage;
   a controller adapted to control an operation of the converter; and
   a control voltage generator adapted to generate a control voltage for operating the controller, wherein
   when the voltage value of the direct-current voltage is higher than a voltage value of the control voltage and a detection signal is not output from the second detector, an operation of the switching elements is stopped.

2. The power converter according to claim 1, wherein the switching elements are each a metal-oxide-semiconductor field-effect transistor of normally-off type.

3. The power converter according to claim 2, wherein the anti-parallel connected diode is a parasitic diode in the metal-oxide-semiconductor field-effect transistor.

4. The power converter according to claim 1, wherein the switching elements are each a metal-oxide-semiconductor field-effect transistor formed of a wide bandgap semiconductor.

5. The power converter according to claim 4, wherein the wide bandgap semiconductor is silicon carbide, gallium nitride, gallium oxide, or diamond.

6. The power converter according to claim 4, wherein the anti-parallel connected diode is a parasitic diode in the metal-oxide-semiconductor field-effect transistor.

7. The power converter according to claim 1, wherein the switching elements are each a metal-oxide-semiconductor field-effect transistor having a super junction structure.

8. The power converter according to claim 7, wherein the anti-parallel connected diode is a parasitic diode in the metal-oxide-semiconductor field-effect transistor.

9. A motor driver comprising the power converter according to claim 1.

10. An air conditioner comprising the motor driver according to claim 9.

11. The air conditioner according to claim 8, wherein the air conditioner includes an outdoor unit, and the controller is adapted to control all the switching elements to off when the control voltage is generated as an outdoor fan in the outdoor unit is rotated by an external force.

* * * * *